United States Patent
Tsuji et al.

(10) Patent No.: US 10,036,345 B2
(45) Date of Patent: Jul. 31, 2018

(54) COMBINATION OF CYLINDER AND PISTON RING

(71) Applicant: Kabushiki Kaisha Riken, Tokyo (JP)

(72) Inventors: Katsuhiro Tsuji, Niigata (JP); Akio Shinohara, Niigata (JP); Masaki Moronuki, Niigata (JP)

(73) Assignee: Kabushiki Kaisha Riken, Tokyo (JP)

( * ) Notice: Subject to any disclaimer, the term of this patent is extended or adjusted under 35 U.S.C. 154(b) by 498 days.

(21) Appl. No.: 14/384,949

(22) PCT Filed: Mar. 5, 2013

(86) PCT No.: PCT/JP2013/055977
§ 371 (c)(1),
(2) Date: Sep. 12, 2014

(87) PCT Pub. No.: WO2013/137060
PCT Pub. Date: Sep. 19, 2013

(65) Prior Publication Data
US 2015/0136062 A1    May 21, 2015

(30) Foreign Application Priority Data

Mar. 14, 2012 (JP) .................. 2012-056685
Sep. 25, 2012 (JP) .................. 2012-210328

(51) Int. Cl.
*F02F 3/00* (2006.01)
*F02F 1/18* (2006.01)
(Continued)

(52) U.S. Cl.
CPC .................. *F02F 1/18* (2013.01); *F16J 9/00* (2013.01); *F16J 9/26* (2013.01); *F16J 10/04* (2013.01); *F02F 1/20* (2013.01)

(58) Field of Classification Search
CPC ........ F02F 1/18; F16J 9/00; F16J 10/04; F16J 9/26
(Continued)

(56) References Cited

U.S. PATENT DOCUMENTS

2002/0022129 A1\* 2/2002 Moronuki .............. C23C 16/30
428/408
2005/0005892 A1   1/2005 Nishimura et al.
(Continued)

FOREIGN PATENT DOCUMENTS

EP   1 510 594 A2   2/2005
JP   2001-280497    10/2001
(Continued)

OTHER PUBLICATIONS

Communication of the extended European search report is enclosed for European Patent Application No. 13761098.6 dated Jan. 27, 2016.
(Continued)

*Primary Examiner* — Lindsay Low
*Assistant Examiner* — Omar Morales
(74) *Attorney, Agent, or Firm* — Jenkins, Wilson, Taylor & Hunt, P.A.

(57) ABSTRACT

A combination of a cylinder 62 of an internal combustion engine and a piston ring 40 for sliding an inner periphery of the cylinder, wherein at least a sliding face of the cylinder is composed of an aluminum alloy including 8 mass % to 22 mass % of Si and at least one or more particles selected from the group consisting of Si, $Al_2O_3$ and $SiO_2$ particles each having a diameter of 3 μm or more, and at least an outer periphery of the piston ring is coated with a hard carbon coating 14 composed only of hydrogen and carbon.

9 Claims, 4 Drawing Sheets

(51) Int. Cl.
*F16J 9/26* (2006.01)
*F16J 10/04* (2006.01)
*F16J 9/00* (2006.01)
*F02F 1/20* (2006.01)

(58) Field of Classification Search
USPC .................................................. 123/193.4
See application file for complete search history.

(56) References Cited

U.S. PATENT DOCUMENTS

| | | | |
|---|---|---|---|
| 2009/0151689 | A1 | 6/2009 | Iwasaki et al. |
| 2010/0295251 | A1* | 11/2010 | Sekiya ............... C23C 14/0664 277/443 |

FOREIGN PATENT DOCUMENTS

| | | |
|---|---|---|
| JP | 2004-347053 | 12/2004 |
| JP | 2006-283970 | 10/2006 |
| JP | 2008-095966 | 4/2008 |
| JP | 2008-180218 | 8/2008 |
| JP | 2008-241032 | 10/2008 |
| JP | 2008-286354 | 11/2008 |
| JP | 2010-274386 | 12/2010 |
| JP | 2010274386 A * | 12/2010 |
| JP | 2011/149035 A | 8/2011 |
| WO | WO 2013/137060 | 9/2013 |

OTHER PUBLICATIONS

International Search Report corresponding to International Patent Application No. PCT/JP2013/055977 dated May 21, 2013.
Notification of Transmittal of Translation of the International Preliminary Report on Patentability (Chapter I or Chapter II of the Patent Cooperation Treaty) corresponding to International Patent Application No. PCT/JP2013/055977 dated Sep. 25, 2014.
ISO 14577-1 (2002) Metallic materials—Instrumented indentation test for hardness and materials parameters. International Standard. Reference No. ISO 14577-1:2002(E):1-32.

* cited by examiner

[Fig. 1]
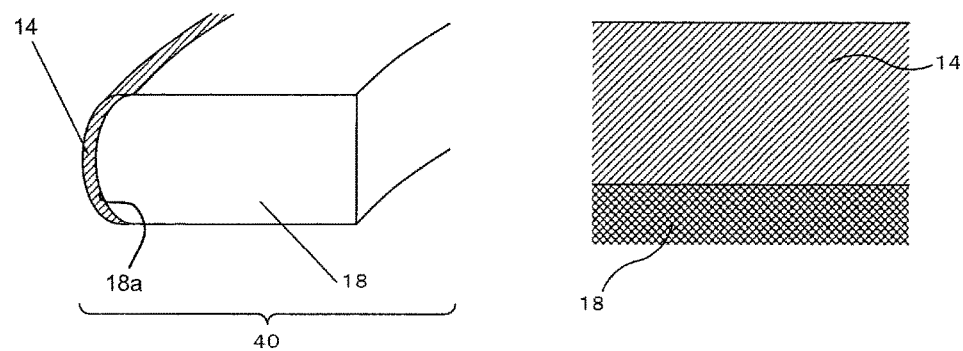
[Fig. 2]
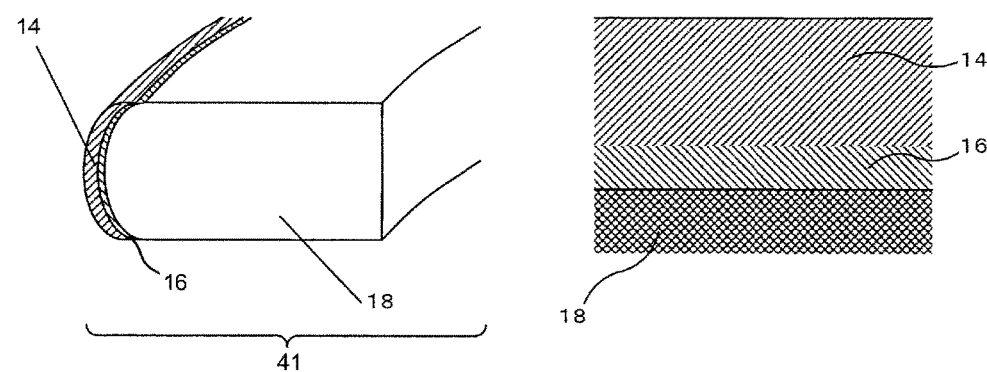
[Fig. 3]
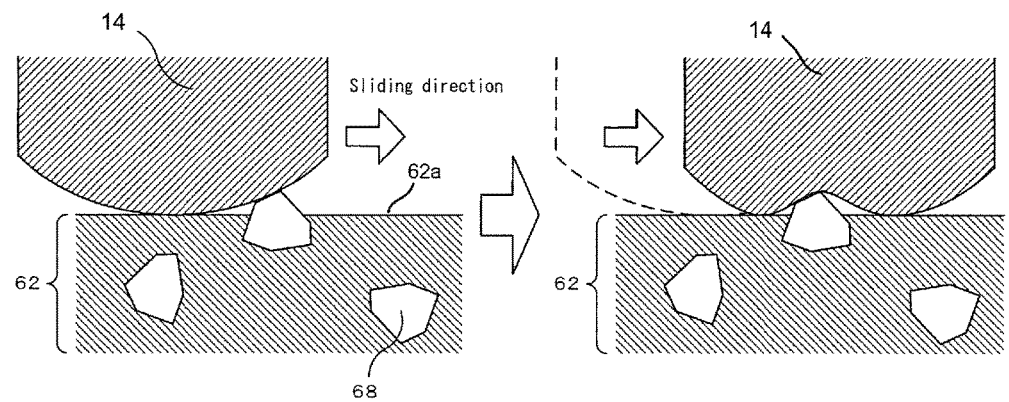

[Fig. 4]
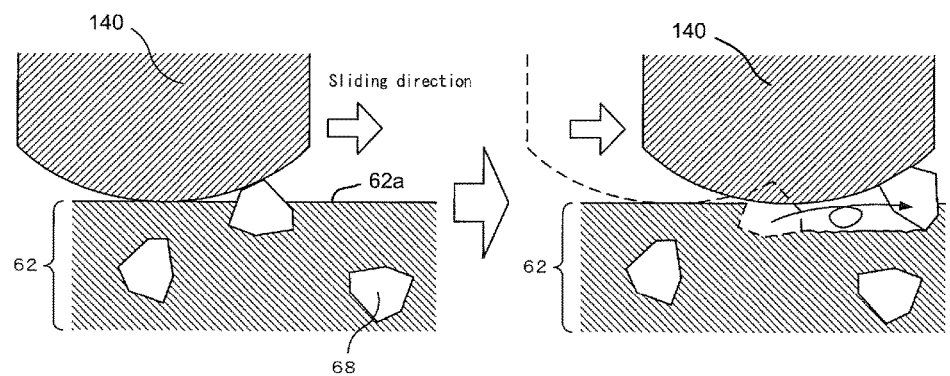
[Fig. 5]
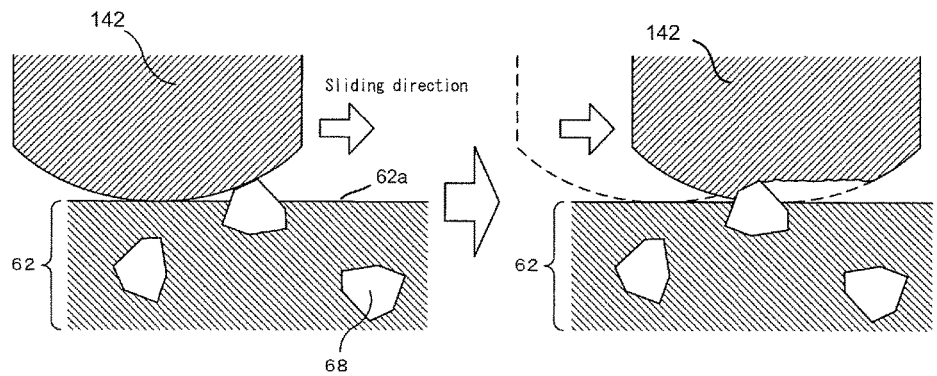

[Fig. 6]
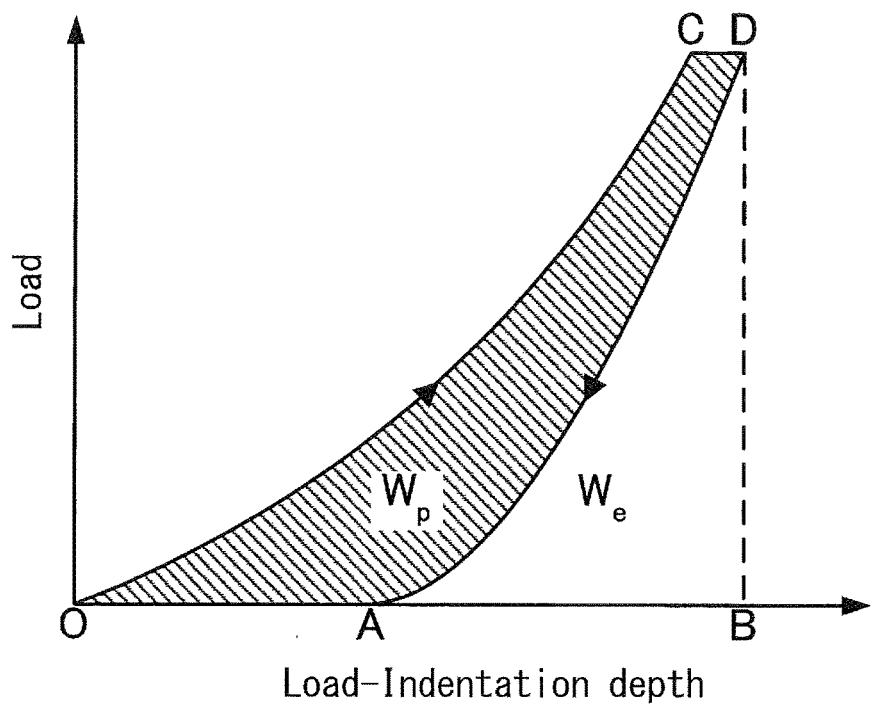
[Fig. 7]
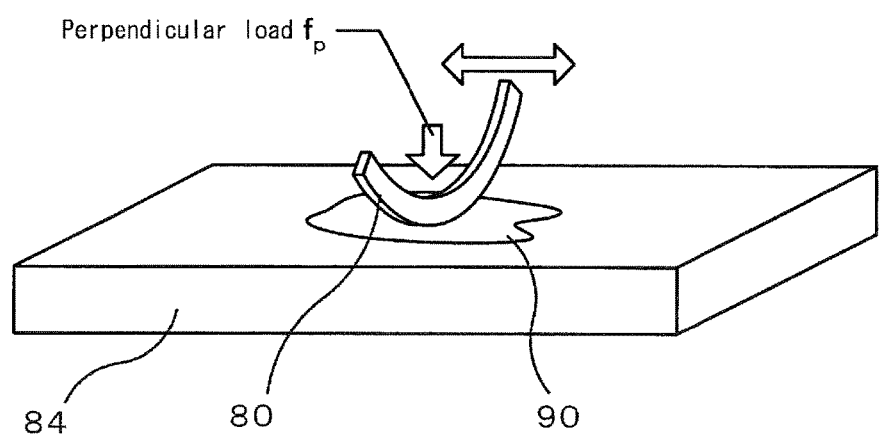

[Fig. 8]
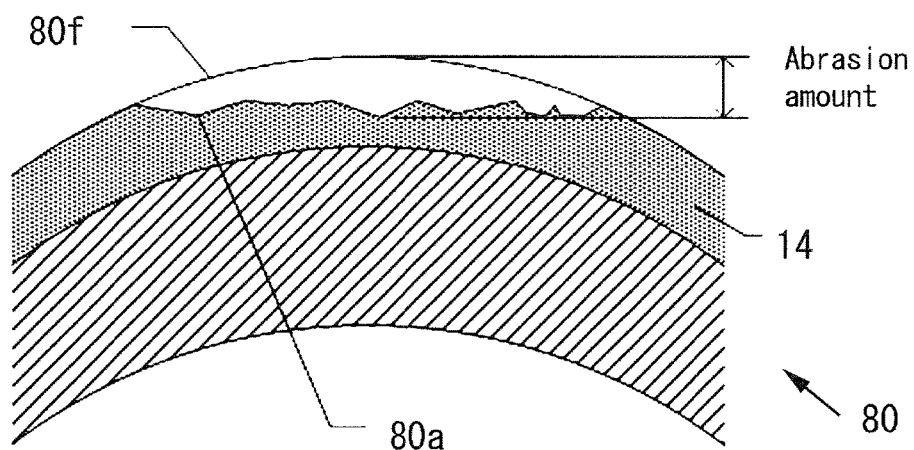
(a)
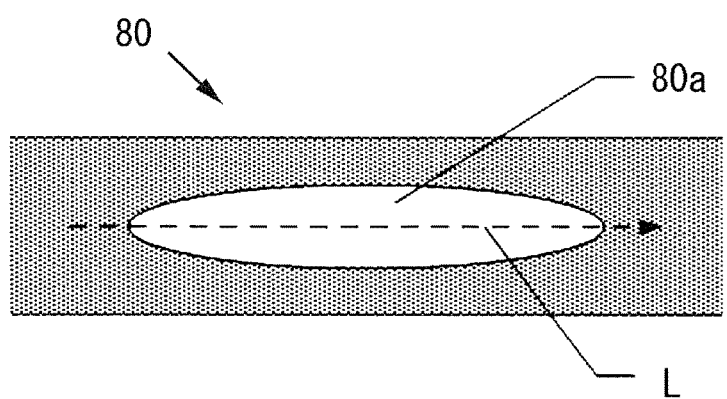
(b)

COMBINATION OF CYLINDER AND PISTON RING

CROSS-REFERENCE TO RELATED APPLICATIONS

This application is a national phase application of PCT International Patent Application PCT/JP2013/055977 filed Mar. 5, 2013, which claims benefit of JP 2012-210328, filed Sep. 25, 2012 and JP 2012-056685, filed Mar. 14, 2012, each of which is herein incorporated by reference in its entirety.

FIELD OF THE INVENTION

The present invention relates to a combination of a cylinder of an internal combustion engine and a piston ring for sliding an inner periphery of the cylinder.

DESCRIPTION OF THE RELATED ART

In order to improve fuel consumption and reduce a size and a weight of an engine for reducing carbon dioxide emissions, a high output internal combustion engine of a vehicle etc. made of aluminum has been sought. Specifically, a cylinder is made of an aluminum alloy, an inner periphery of the cylinder where a piston ring slides along is surface treated, e.g., plated, or a whole cylinder including a sliding face is made of an aluminum alloy. The cylinder is generally produced by casting an aluminum alloy containing a high content of Si.

Since the aluminum alloy is relatively soft, the inner periphery of the cylinder is covered with a cylinder liner in the related art. According to a current technology, after a cylinder block is casted, only an aluminum matrix on a sliding face side is selectively etched by electrolytic etching, and precipitated Si particles are exposed on the surface to improve abrasion resistance (see Patent Document 1).

Meanwhile, it is suggested that an outer periphery of a piston ring sliding along the cylinder made of aluminum alloy is coated with a hard carbon coating to decrease a friction coefficient and to improve scuffing resistance.

For example, it is reported that a hard carbon coating containing including 5 to 30 atom % of Si or W and having hardness Hv of 700 to 2000 is formed around the outer periphery of the piston ring (see Patent Document 2). In addition, it is reported that a carbide of an element selected from the group consisting of Si, Ti, W, Cr, Mo, Nb and V is dispersed, and a hard carbon coating having hardness Hv of 700 to 2000 is formed around the outer periphery of the piston ring (see Patent Document 3).

[Patent Literature 1] Japanese Unexamined Patent Publication (Kokai) 2008-180218 (claim 13)
[Patent Literature 2] Japanese Unexamined Patent Publication (Kokai) 2008-95966
[Patent Literature 3] Japanese Unexamined Patent Publication (Kokai) 2001-280497

SUMMARY OF THE INVENTION

Problems to be Solved by the Invention

For example, the sliding face of a cylinder is reinforced by adding Si to an aluminum alloy to precipitate Si particle, $Al_2O_3$ or $SiO_2$ particles. For the cylinder so formed, a piston ring having a hard carbon coating around an outer surface and having a high scuffing resistance is used, whereby these particles in an inner periphery of the cylinder may be chipped or dropped. As a result, the inner periphery of the cylinder cannot be held smooth for a long period of time. Undesirably, the abrasion resistance is decreased.

Through intense studies by the present inventor, it has been found that when the hard carbon coating containing a metal component such as W slides with the aluminum alloy on the inner periphery of the cylinder, the sliding face of the cylinder has fine irregularities and a pear skin. This may be because of the following reason: A metal bond where metal ions are interacted with each other via free electrons is generated. Metal components contained in the hard carbon coating are bonded to Al of the aluminum alloy to be slid to form fine abrasion powder. The abrasion powder attacks Al of the aluminum alloy that is relatively soft.

The present invention is to solve the above-described problems. An object is to provide a combination of a cylinder and a piston ring that can hold a smooth shape of an inner periphery of the cylinder and abrasion resistance for a long period of time when a cylinder made of an aluminum alloy is combined with a piston ring having a hard carbon coating on an outer surface.

Means for Solving the Problems

The present invention is a combination of a cylinder of an internal combustion engine and a piston ring for sliding an inner periphery of the cylinder, wherein at least a sliding face of the cylinder is composed of an aluminum alloy including 8 mass % to 22 mass % of Si and at least one or more particles selected from the group consisting of Si, $Al_2O_3$ and $SiO_2$ particles each having a diameter of 3 μm or more, and at least an outer periphery of the piston ring is coated with a hard carbon coating composed only of hydrogen and carbon.

By this configuration, the hard carbon coating itself has elasticity. Therefore, even when the hard particles are pushed into the surface of the hard carbon coating, the coating itself is elastically deformed and receives the force. Next, when the piston ring is moved to release the force, the hard carbon coating is elastically deformed and returns to the original. In this manner, the particles in the inner periphery of the cylinder are not dropped, and the hard carbon coating itself is not damaged.

Accordingly, the smooth shape of the inner periphery of the cylinder and the abrasion resistance can be maintained for a long period of time.

The present invention is combination of a cylinder of an internal combustion engine and a piston ring for sliding an inner periphery of the cylinder, wherein at least a sliding face of the cylinder is composed of an aluminum alloy including 8 mass % to 22 mass % of Si and at least one or more particles selected from the group consisting of Si, $Al_2O_3$ and $SiO_2$ particles each having a diameter of 3 μm or more, and at least an outer periphery of the piston ring is coated with a hard carbon coating composed of hydrogen, carbon and nitrogen.

By this configuration, the hard carbon coating itself has elasticity. Therefore, even when the hard particles are pushed into the surface of the hard carbon coating, the coating itself is elastically deformed and receives the force. Next, when the piston ring is moved to release the force, the hard carbon coating is elastically deformed and returns to the original. In this manner, the particles in the inner periphery of the cylinder are not dropped, and the hard carbon coating itself is not damaged.

Accordingly, the smooth shape of the inner periphery of the cylinder and the abrasion resistance can be maintained for a long period of time.

Preferably, the hard carbon coating has a Martens' hardness (an indentation hardness) of 5 GPa to 13 GPa. Preferably, the hard carbon coating has a Young's modulus of 70 GPa to 200 GPa. Preferably, the hard carbon coating has a deformation ratio Rpe (Wp/We) represented by a ratio of plastic deformation energy Wp to elastic deformation energy We of 0.45 or less.

By the configuration, the hard carbon coating is not too hard and not too soft, and can exert the above-described effect with certainty.

When the hard carbon coating is composed of hydrogen and carbon, a hydrogen content of the hard carbon coating is preferably 20 atom % to 35 atom %.

When the hard carbon coating is composed of hydrogen, carbon and nitrogen, a hydrogen content of the hard carbon coating is preferably 15 atom % to 30 atom %.

When the hard carbon coating is composed of hydrogen, carbon and nitrogen, a nitrogen content of the hard carbon coating is 3 atom % to 12 atom %.

Preferably, the hard carbon coating has a thickness of 2 µm or more to 10 µm or less.

Preferably, the hard carbon coating has a ten point height of roughness profile Rzjis of 0.15 µm or less.

Effects of the Invention

According to the present invention, when the cylinder made of an aluminum alloy is combined with the piston ring having a hard carbon coating on an outer surface, a smooth shape of an inner periphery of the cylinder and abrasion resistance can be maintained for a long period of time.

BRIEF DESCRIPTION OF THE DRAWINGS

FIG. 1 A schematic partial sectional view of a piston ring according to an embodiment of the present invention.

FIG. 2 A schematic partial sectional view of a piston ring according to another embodiment of the present invention.

FIG. 3 A schematic view showing that a hard carbon coating formed on an outer periphery of a piston ring slides along a cylinder.

FIG. 4 A schematic view showing that a hard carbon coating slides along cylinder, where the coating being hard.

FIG. 5 A schematic view showing that a soft hard carbon coating slides along a cylinder, where the coating being soft.

FIG. 6 A view showing a load-indentation curve provided by a loading and unloading test using a hardness tester.

FIG. 7 A view showing a reciprocation sliding test method.

FIG. 8 A view showing a calculation method of an abrasion amount of the hard carbon coating.

DESCRIPTION OF THE EMBODIMENTS

Hereinafter, embodiments according to the present invention will be described. In the context of the present invention, "%" denotes "mass %" unless otherwise specified.

The present invention is a combination of a cylinder of an internal combustion engine and a piston ring for sliding an inner periphery of the cylinder. The piston ring is fitted to an outer periphery of a known piston. When the piston performs reciprocating motion within the cylinder, an outer periphery of the piston ring slides along an inner periphery of the cylinder.

<Cylinder>

At least a sliding face of the cylinder is made of an aluminum alloy containing 8 mass % to 22 mass % of Si and one or more types of particles selected from the group consisting of Si, $Al_2O_3$ and $SiO_2$ particles each having a diameter of 3 µm or more.

When the aluminum alloy contains less than 8 mass % of Si, amount and size of precipitated Si particles are decreased, whereby sufficient abrasion resistance is difficult to be provided. In addition, as the aluminum alloy has insufficient strength, the particles held within the aluminum alloy matrix are easily dropped off, whereby sufficient abrasion resistance is difficult to be provided. On the other hand, the aluminum alloy contains more than 22 mass % of Si, the precipitated Si particles inhibit processing, thereby increasing the production costs.

In addition, the aluminum alloy contains one or more types of particles selected from the group consisting of Ai, $Al_2O_3$ and $SiO_2$ having a diameter of 3 µm or more. These particles are harder than Al and prevent Al of the aluminum alloy from being in directly contact with and sliding along the surface of the piston ring to improve the abrasion resistance. If the particles have a diameter of less than 3 µm, the abrasion resistance is not sufficiently improved.

These particles are precipitated Si in the alloy when the cylinder is casted from the aluminum alloy, for example. Alternatively, a dispersion hardening alloy where $Al_2O_3$ and $SiO_2$ are added to molten aluminum may be used. The diameter of these particles are measured as follows: The cross-section of the resultant cylinder is measured by a scanning electron microscope (SEM). With the image of the measured cross-section, a two-dimensional distribution of the elements configuring the area having the composition (the particles) different from the Al matrix (base) is measured using an energy dispersive X-ray analysis (EDX) apparatus attached to the SEM.

Specifically, in the EDX measurement, after the SEM image is gained, Al, Si and O (oxygen) are objects to be measured. Al is mapped, and O is also mapped. These mapping is combined such that the distribution of $Al_2O_3$ or $SiO_2$ can be determined. From the resultant two-dimensional distribution, each diameter of a circle (an equivalent circle diameter) corresponding to each area (particle) is determined as the particle diameter. The diameters of all particles thus calculated are averaged.

At least a sliding face of the cylinder may be made of an aluminum alloy. For example, the cylinder liner made of the aluminum alloy may be fitted to an internal periphery of a cylinder bore made of a material different from the aluminum alloy. In terms of improving productivity and decreasing production costs, the whole cylinder is preferably made of the aluminum alloy.

<Piston Ring>

As shown in FIG. 1, at least an outer periphery 18a of a piston ring 40 is coated with a hard carbon coating 14 composed of hydrogen and carbon.

In the context of the present invention, the hard carbon coating 14 composed of only "hydrogen and carbon" refers to "a first hard carbon coating", the hard carbon coating 14 composed of "hydrogen, carbon and nitrogen" refers to "a second hard carbon coating". Hereinafter, "the hard carbon coating" includes both of "the first hard carbon coating" and "the second hard carbon coating".

A reference numeral 18 designates a base of the piston ring 40, which is made of stainless steel, for example. In addition, as shown in FIG. 2, an intermediate layer 16 may be disposed between the hard carbon coating 14 and the base 18. The intermediate layer 16 is preferably (1) a metal layer made of chromium or titanium, (2) a metal carbide layer made of tungsten carbide or silicon carbide, (3) a carbon layer (metal containing carbon layer) containing one or more of chromium carbide, titanium carbide, tungsten carbide and silicon carbide, (4) a carbon layer containing no metal, or a combination of two or more of (1) to (4). The layer (3) is different from the layer (2) made of tungsten carbide or silicon carbide itself in that the layer (3) is the carbon layer containing particles of tungsten carbide or silicon carbide. In addition, the intermediate layer (16) may be a laminate of the layer (4) and the layer (2).

The hard carbon coating 14 may be formed on at least the outer periphery 18a of the piston ring 40. Also, the hard carbon coating 14 may be formed on a part of upper and lower surfaces of the piston ring 40.

Herein, "composed of only hydrogen and carbon" means that a total of hydrogen and carbon is 98 atom % or more in total components of the hard carbon coating, and carbon is 97 atom % or more in the components excluding hydrogen. The composition contains less impurity components other than hydrogen and carbon. When the hard carbon coating is composed of only hydrogen and carbon, the coating itself is not too hard and is easily elastically deformed, thereby maintaining abrasion resistance (see FIG. 3).

Similarly, "composed of hydrogen, carbon and nitrogen" means that a total of hydrogen, carbon and nitrogen is 98 atom % or more in total components of the hard carbon coating, and a total of carbon and nitrogen is 97 atom % or more in the components excluding hydrogen. The composition contains less impurity components other than hydrogen, carbon and nitrogen. When the hard carbon coating is composed of hydrogen, carbon and nitrogen, the coating itself is not too hard and is easily elastically deformed, thereby maintaining abrasion resistance (see FIG. 3).

The content of hydrogen, carbon and nitrogen of the hard carbon coating can be measured as follows: Firstly, a hydrogen content (unit: atom %) in the coating is measured by RBS (Rutherford Backscattering Spectrometry)/HFS (Hydrogen Forward scattering Spectrometry). Next, a secondary ion intensity of hydrogen, carbon and nitrogen are measured by SIMS (Secondary Ion-microprobe Mass Spectrometry) respectively. From the percentage and the hydrogen content determined by the RBS/HFS, a carbon content is determined.

In order to provide the first hard carbon coating with sufficient elasticity, the first hard carbon coating preferably contains 20 atom % to 35 atom % of hydrogen. If the hydrogen content of the first hard carbon coating exceeds 35 atom %, the abrasion resistance may be difficult to be maintained. On the other hand, the hydrogen content of the first hard carbon coating is less than 20 atom %, the coating may become too hard or be difficult to be elastically deformed. The first hard carbon coating attacks the above-described hard particles exposed on a surface of the cylinder. As a result, the particles are chipped or dropped, and the surface of the cylinder may be damaged.

Similarly, in order to provide the second hard carbon coating with sufficient elasticity, the second hard carbon coating preferably contains 15 atom % to 30 atom % of hydrogen and 3 atom % to 12 atom % of nitrogen. If the hydrogen content exceeds 30 atom % or the nitrogen content exceeds 12 atom % in the second hard carbon coating, the abrasion resistance may be difficult to be maintained. On the other hand, the hydrogen content is less than 15 atom % or the nitrogen content is less than 3 atom % in the second hard carbon coating, the coating may become too hard or be difficult to be elastically deformed. The second hard carbon coating attacks the above-described hard particles exposed on the surface of the cylinder. As a result, the particles are chipped or dropped, and the surface of the cylinder may be damaged.

The first hard carbon coating composed of only hydrogen and carbon described above can be formed using various methods such as a CVD (Chemical Vapor Deposition) process and a PVD (Physical Vapor Deposition) process without feeding gas other than raw material gas, i.e., hydrogen and hydrocarbon gas (including carbon and hydrogen configuring the first hard carbon coating) and noble gas such as Ar that assists discharge excluding components inevitably mixed into the component due to a leak or a discharge gas from a jig. Thus, the first hard carbon coating can be formed without feeding other than hydrogen and carbon.

Also, the second hard carbon coating composed of hydrogen, carbon and nitrogen described above can be formed using various methods such as a CVD (Chemical Vapor Deposition) process and a PVD (Physical Vapor Deposition) process without feeding gas other than raw material gas, i.e., hydrogen, nitrogen, hydrocarbon gas and ammonia (including carbon, hydrogen and nitrogen configuring the second hard carbon coating) and noble gas such as Ar that assists discharge excluding components inevitably mixed into the component due to a leak or a discharge gas from a jig. Thus, the second hard carbon coating can be formed without feeding other than hydrogen, carbon and nitrogen.

Examples of the hydrocarbon gas include methane and acetylene.

The CVD process includes a plasma vapor phase synthesis process (plasma CVD process) utilizing plasma formed by glow discharge, arc discharge etc. The PVD process includes a reactive sputtering process using a carbon target as a sputtering target.

In addition, the hydrogen content in the hard carbon coating can be adjusted by changing a hydrogen gas amount introduced upon film formation, or changing a percentage of hydrogen and carbon in the hydrocarbon gas. A nitrogen amount can be adjusted by changing a percentage of a nitrogen gas, ammonia and other gas introduced upon the film formation.

FIG. 3 is a schematic view showing that the hard carbon coating 14 formed on the outer periphery of the piston ring 40 slides along a cylinder 62. The aluminum alloy of the cylinder 62 contains hard particles 68 in the Al matrix. The particles 68 are partly exposed on an inner periphery (a sliding face) 62a of the cylinder. The hard carbon coating 14 is contacted with and slides along the inner periphery 62a. As described above, the hard carbon coating 14 itself has elasticity. Therefore, even when the hard particles 68 are pushed into the surface of the hard carbon coating 14, the coating itself is elastically deformed and receives the force. Next, when the piston ring is moved to release the force, the hard carbon coating 14 is elastically deformed and returns to the original. In this manner, the particles 68 in the inner periphery 62a of the cylinder are not dropped, and the hard carbon coating 14 itself is not damaged.

Accordingly, the smooth shape of the inner periphery 62a of the cylinder and the abrasion resistance can be maintained for a long period of time.

Preferably, the hard carbon coating has a Martens' hardness (an indentation hardness) of preferably 5 GPa to 13 GPa and a Young's modulus of 70 GPa to 200 GPa.

FIG. 4 schematically shows that the hard carbon coating 140 slides along the cylinder 62 when the hard carbon coating 140 has the Martens' hardness of more than 13 GPa and the Young's modulus of more than 200 GPa.

As the hard carbon coating 140 is extremely hard, when the hard carbon coating 140 comes in contact with the particles 68 in the inner periphery 62*a* of the cylinder, the particles 68 are pushed away or broken. The hard carbon coating 140 drags the particles 68, and the particles 68 scratch and slide an Al base of the inner peripheral 62*a* of the cylinder, as the piston ring is moved. Thus, the inner peripheral 62*a* of the cylinder may be damaged. In addition, the hard carbon coating 140 entangles and catches the particles 68, which changes the friction coefficient of the hard carbon coating 140 to cause a stick-slip phenomenon easily. Once the stick-slip phenomenon occurs, the inner periphery 62*a* of the cylinder may be partly worn by sticking, thereby forming large irregularities (wavy wear) on the inner periphery 62*a*.

On the other hand, when the hard carbon coating has the Martens' hardness of less than 5 GPa and the Young's modulus of less than 70 GPa, the abrasion resistance of the hard carbon coating is insufficient. Therefore, the hard carbon coating may be worn out during use, and the scuffing resistance may be difficult to be maintained (FIG. 5).

The Martens' hardness is measured using a hardness tester in accordance with ISO14577-1 (instrumented indentation test for hardness and materials parameters). For example, as the hardness tester, an ultra-micro hardness tester (Model # DUH-211) manufactured by Shimadzu Corporation is used, and measurement conditions are as follows: Indenter: Berkovich indenter, Test mode: Loading-unloading test, Test force: 19.6 [mN], Loading-unloading speed: 0.4877 [mN/sec], Loading-unloading holding time: 5 [sec], Cf-Ap correction.

The Young's modulus is measured by a loading and unloading test for determining elastic recovery around a tip of the indenter from a loading-indentation depth (displacement) diagram, when the indenter is unloaded by the hardness tester after indentation. For example, the Young's modulus can be measured using the above-described hardness tester under the above-described conditions.

Preferably, the hard carbon coating has a deformation ratio Rpe (Wp/We) represented by a ratio of plastic deformation energy Wp to elastic deformation energy We of 0.45 or less.

Here, the plastic deformation energy Wp is an energy required to keep deformation of the coating after the indenter is removed, among works (energies) required to the deformation of the coating by the indenter indented into in the hardness test. The elastic deformation energy We is an energy that is released by removing the indenter and returning the coating to the original position. Thus, Rpe represented by the ratio (Wp/We) is an index to characterize the coating that is easily elastically deformed or plastically deformed when a foreign matter is pushed into the surface of the coating.

For example, when the coating is only elastically deformed, only the We is required. Therefore, the Rpe is 0 (zero). Specifically, a total of Wp and We shown in FIG. 6 described later is a total of deformation energies. The proportion of Wp and We determine which one of the elastic deformation and the plastic deformation more easily occurs.

On the other hand, an increase in the Rpe, i.e., an increase in the percentage of the plastic deformation energy Wp means increases in deformation on the surface of the coating and a plastic deformation amount that are not disappeared by removing a load by a diamond indenter in the hardness test.

FIG. 5 schematically shows that the hard carbon coating 142 having the Rpe of more than 0.45 where the plastic deformation easily occurs slides along the cylinder 62. The hard carbon coating 142 is difficult to be elastic-deformed and is soft. Therefore, once the hard carbon coating 142 is in contact with the particles 68 in the inner periphery 62*a* of the cylinder, the particles 68 pierce through the surface of the hard carbon coating 142. As the particles 68 slide along and scratch the hard carbon coating 142, the hard carbon coating 142 is easily abraded.

It is found that the abrasion is increased when the particles 62 included in the aluminum alloy of the cylinder 62 each has a diameter of 3 μm or more. In particular, the abrasion is increased when the particles 62 each has a diameter of 5 μm or more.

The plastic deformation energy and the elastic deformation energy of the hard carbon coating are calculated using a load-indentation curve provided by the above-described hardness tester. FIG. 6 shows an illustrative calculation method. When the indenter is indented into the surface of the hard carbon coating, an indentation depth is increased with the increasing the load (curve OC). When the load reaches the maximum, the maximum load is kept for a predetermined time (line CD). In general, during holding the load, the coating around the indenter may be deformed and the indentation depth may be increased. Next, when the load is removed, the elastic-deformed indentation depth is recovered and the elastic-deformed indentation becomes deeper than that before the indenter is contacted (curve DA). In the resultant load-indentation curve, an area OADC represents the plastic deformation energy Wp required for plastic deformation of the coating by the indentation of the indenter. An area ABD represents the elastic deformation energy We required for elastic deformation of the coating by the indentation of the indenter.

Preferably, the hard carbon coating has a thickness of 2 μm or more to 10 μm or less.

If the hard carbon coating has a thickness of less than 2 μm, the particles 68 exposed on the inner periphery 62*a* of the cylinder are pushed into the hard carbon coating and the hard carbon coating is not sufficiently elastic-deformed. As the hard carbon film slides, the particles 68 move and scratch the inner peripheral 62*a* of the cylinder, thereby abrading the inner peripheral 62*a* of the cylinder. On the other hand, if the hard carbon coating has a thickness exceeding 10 μm, the effect is saturated and the costs may be increased. The thickness of the hard carbon coating is determined using a slice produced by a focused ion beam (FIB) processing such that a section of the slice in a thickness direction is measured by a transmission electron microscope (TEM).

The hard carbon coating has ten point height of roughness profile Rzjis of preferably 0.15 μm or less, more preferably 0.12 μm or less.

When the hard carbon coating is formed using a CVD process or a PVD process such as a plasma vapor phase synthesis process or a reactive sputtering process, the surface of the coating is not fully smooth, and minute protrusions may be formed thereon. The protrusions may scratch the base Al of the aluminum alloy of the cylinder, and flaws may be formed on the inner periphery of the cylinder. In order to avoid this, the surface of the hard carbon coating is polished, as appropriate. Adjustment is preferable to have the ten point height of roughness profile Rzjis on the surface of 0.15 μm or less.

The ten point height of roughness profile Rzjis is measured in accordance with JIS B 0601 (2001).

EXAMPLE

First Hard Carbon Coating Experiment

Examples 1 to 6 and Comparative Examples 1 to 4 are experiments for a first hard carbon coating experiment.

Examples 1 to 3

A degreased piston ring (equivalent to nitriding stainless steel SUS420J2, nominal diameter: φ90 mm, thickness ($h_1$): 1.2 mm, width ($a_1$): 3.2 mm) was stacked on a film formation jig with a metal bar for filling a closed gap, and a first hard carbon coating was formed at an outer periphery of the piston ring.

The piston ring was placed on a rotating mechanism of a film formation apparatus. The apparatus was vacuum-evacuated to a pressure of $5 \times 10^{-3}$ Pa or less. After the vacuum evacuation, ion bombardment was performed on the piston ring to clean a coating formation surface, and a Cr intermediate layer was formed on the surface of the piston ring. Thereafter, while $C_2H_2$ and Ar were introduced into the apparatus, the first hard carbon coating was formed on the Cr intermediate layer by a plasma CVD method.

Examples 4 to 6

The same processing was performed similar to Example 1 except that the first hard carbon film was formed by feeding $C_2H_2$, Ar and $H_2$, respectively, with a reactive sputtering method using a sputtering source including a graphite target.

Comparative Example 1

The same processing was performed similar to Example 1 except that a hydrogen content of the coating was increased by increasing a flow rate of $H_2$ fed to provide Comparative Example 1.

Comparative Example 2

The same processing was performed similar to Example 6 except that the plasma CVD method was done in a short time and the first hard carbon coating was thin to provide Comparative Example 2.

Comparative Example 3

The same processing was performed similar to Example 4 except that a bias voltage applied to the sputtering source including the graphite target was tripled. At this time, it was confirmed that a surface roughness Rzjis of the first hard carbon coating exceeds 0.15 μm with no polish. Thus, Comparative Example 3 was provided.

Comparative Example 4

The same processing was performed similar to Example 1 except that an arc type evaporation source having a magnetic filter was used, a graphite cathode (98% mass or more of carbon) was used, $H_2$ was introduced upon arc discharge, a pressure of the apparatus was set to $5 \times 10^{-2}$ Pa, and the graphite cathode was evaporated by the arc discharge to form the first hard carbon coating to provide Comparative Example 4.

Second Hard Carbon Coating Experiment

Examples 11 to 16 and Comparative Examples 11 to 15 are experiments for a second hard carbon coating experiment.

Examples 11 to 13

A degreased piston ring (equivalent to nitriding stainless steel SUS420J2, nominal diameter: φ90 mm, thickness ($h_1$): 1.2 mm, width ($a_1$): 3.2 mm) was stacked on a film formation jig with a metal bar for filling a closed gap, and a second hard carbon coating was formed at an outer periphery of the piston ring.

The piston ring was placed on a rotating mechanism of a film formation apparatus. The apparatus was vacuum-evacuated to a pressure of $5 \times 10^{-3}$ Pa or less. After the vacuum evacuation, ion bombardment was performed on the piston ring to clean a coating formation surface, and a Cr intermediate layer was formed on the surface of the piston ring. Thereafter, while $C_2H_2$, $N_2$ and Ar were introduced into the apparatus, the second hard carbon coating was formed on the Cr intermediate layer by a plasma CVD method.

Examples 14 to 16

The same processing was performed similar to Example 11 except that the second hard carbon film was formed by feeding $C_2H_2$, $N_2$, Ar and $H_2$, respectively, with a reactive sputtering method using a sputtering source including a graphite target.

Comparative Example 11

The same processing was performed similar to Example 11 except that a hydrogen content of the coating was increased by increasing a flow rate of $H_2$ fed to provide Comparative Example 11.

Comparative Example 12

The same processing was performed similar to Example 16 except that the plasma CVD method was done in a short time and the second hard carbon coating was thin to provide Comparative Example 12.

Comparative Example 13

The same processing was performed similar to Example 14 except that the bias voltage applied to the sputtering source including the graphite target was tripled. At this time, it was confirmed that the surface roughness Rzjis of the second hard carbon coating exceeds 0.15 μm with no polish. Thus, Comparative Example 13 was provided.

Comparative Example 14

The same processing was performed similar to Example 11 except that an arc type evaporation source having a magnetic filter was used, a graphite cathode (98% mass or more of carbon) was used, $H_2$ was introduced upon arc discharge, a pressure of the apparatus was set to $8 \times 10^{-2}$ Pa, and the graphite cathode was evaporated by the arc discharge to form the second hard carbon coating to provide Comparative Example 14.

Comparative Example 15

The same processing was performed similar to Example 11 except that $C_2H_2$, $N_2$, Ar and $H_2$ were fed into the apparatus, and a coating having a high nitrogen content was formed by the reactive sputtering method using the sputtering source including a graphite target. Thus, Comparative Example 15 was provided.

Evaluation

The following evaluations are common to the first hard carbon coating and the second hard carbon coating.

1. Martens' Hardness and Young's Modulus of Hard Carbon Coating

The Martens' hardness and the Young's modulus were measured as described above. Measurements of the Martens' hardness and the Young's modulus were made 14 times, respectively. Each average value was calculated from the resultant values excluding total four values of a largest value, a next largest value, a smallest value and a next smallest value. In addition, in order to decrease the effect of the surface roughness on the test, steel balls each having a diameter of 30 mm or more on which a diamond paste having an average diameter of 0.25 μm was coated were used to spherically polish around the surface of the hard carbon coating. The polished parts were used for measurements. At this time, a maximum depth of the polished parts was limited to 1/10 or less of the film thickness of the hard carbon coating.

2. Deformation Ratio Rpe of Hard Carbon Coating

The deformation ratio Rpe was determined as described above. A trapezoid rule was used to calculate numerical area values of each region OADC or ABD from the load-indentation curve in FIG. 6. Measurements of the load-indentation curve were made 14 times. Total four values of a largest value, a next largest value, a smallest value and a next smallest value were excluded from the calculated Wp values. The We was calculated for each, and the Rpe was calculated per measurement. Each average value was calculated.

3. Contents of Hydrogen, Carbon and Nitrogen of Hard Carbon Coating Formed Around Outer Periphery of Piston Ring Hydrogen, carbon and nitrogen contents in the hard carbon film were determined by the RBS/HFS and the SIMS as described above. Firstly, by the RBS/HFS, the hydrogen content (unit: atom %) in the coating was measured. Next, by the SIMS, secondary ion intensities of hydrogen, carbon and nitrogen were measured. From the ratio and the hydrogen content determined by the RBS/HFS, the carbon content and the nitrogen content were determined.

Note that the hard carbon coating formed at the outer periphery of the piston ring was not flat. Therefore, the RBS/HFS measurement could not be made without change. Then, as a standard sample, a flat test piece that was mirror polished (quenched SKH 51 material disc, diameter of 25× thickness of 5 (mm), hardness of HRC 60 to 63) was used and the hard carbon coating was formed thereon. The standard sample was produced for the first hard carbon coating and the second hard carbon coating, respectively. The standard sample for the first hard carbon coating is referred to as a "first standard sample", and the standard sample for the second hard carbon coating is referred to as a "second standard sample".

<Standard Sample for First Hard Carbon Coating>

The first standard samples were film-formed by feeding $C_2H_2$, Ar and $H_2$ as atmosphere gas using the reactive sputtering method. The hydrogen contents in the first standard samples were adjusted by changing the flow rate of $H_2$ fed and an overall pressure. In this way, the hard carbon coatings composed of only hydrogen and carbon and having different hydrogen contents were formed. The compositions (all elements including hydrogen) of the hard carbon coatings of the first standard samples were evaluated by the RBS/HFS. It was confirmed that a total of hydrogen and carbon contained in each hard carbon coating formed on each first standard sample was 98 atom % or more and carbon contained therein excluding hydrogen was 97 atom % or more.

Next, each coating of the first standard sample was analyzed by the SIMS to measure the secondary ion intensities of hydrogen and carbon. Here, by the SIMS analysis, an outer periphery of a non-flat piston ring actually used can be measured. Thus, for the same coating of each first standard sample, an empirical formula (a calibration curve) showing a relationship between the hydrogen content and the carbon content (unit: atom %) provided by the RBS/HFS and the ratio of the secondary ion intensities of hydrogen and carbon provided by the SIMS was obtained. In this way, from the secondary intensities of hydrogen and carbon by the SIMS measured for the outer periphery of the piston ring actually used, the hydrogen content and the carbon content can be calculated.

Next, each first hard carbon coating formed around the outer periphery of the piston rings in actual Examples and Comparative Example was analyzed by the SIMS. After a confirmation that secondary ion intensities of other elements than hydrogen and carbon were sufficiently low (not more than 1/100 of total secondary ion intensities of hydrogen and carbon), the above-described empirical formula was used to determine the hydrogen content and the carbon content. Here, the values of the secondary ion intensities by the SIMS of the respective elements were average of each secondary ion intensity observed in the range of a depth of at least 20 nm from a surface of the coating over a 50 nm bounds.

<Standard Sample for Second Hard Carbon Coating>

The second standard samples were film-formed by feeding $C_2H_2$, $N_2$, Ar and $H_2$ as atmosphere gas using the reactive sputtering method. The hydrogen contents in the second standard samples were adjusted by changing the flow rate of $H_2$ fed and an overall pressure. In this way, the hard carbon coatings composed of hydrogen, carbon and nitrogen and having different hydrogen and nitrogen contents were formed. The compositions (all elements including hydrogen) of the hard carbon coatings of the second standard samples were evaluated by the RBS/HFS. It was confirmed that a total of hydrogen, carbon and nitrogen contained in each hard carbon coating formed on each second standard sample was 98 atom % or more and a total of carbon and nitrogen contained therein excluding hydrogen was 97 atom % or more.

Next, each coating of the second standard sample was analyzed by the SIMS to measure the secondary ion intensities of hydrogen, carbon and nitrogen. Here, by the SIMS analysis, an outer periphery of a non-flat piston ring actually used can be measured. Thus, for the same coating of each second standard sample, an empirical formula (a calibration curve) showing a relationship between the hydrogen content and the carbon content (unit: atom %) provided by the RBS/HFS and the ratio of the secondary ion intensities of hydrogen, carbon and nitrogen provided by the SIMS was obtained. In this way, from the secondary intensities of hydrogen and carbon by the SIMS measured for the outer periphery of the piston ring actually used, the hydrogen content, the carbon content and the nitrogen content can be calculated.

Next, each second hard carbon coating formed around the outer periphery of the piston rings in actual Examples and Comparative Example was analyzed by the SIMS. After a confirmation that secondary ion intensities of other elements than hydrogen, carbon and nitrogen were sufficiently low (not more than 1/100 of total secondary ion intensities of hydrogen, carbon and nitrogen), the above-described empirical formula was used to determine the hydrogen content, the carbon content and the nitrogen content. Here, the values of the secondary ion intensities by the SIMS of the respective elements were average of each secondary ion intensity observed in the range of a depth of at least 20 nm from a surface of the coating over a 50 nm bounds.

4. Ten Point Height of Roughness Profile Rzjis and Film Thickness of Hard Carbon Coating The ten point height of roughness profile Rzjis and the film thickness were measured as described above. A stylus type surface roughness tester (manufactured by TOKYO SEIMITSU CO., LTD., SURFCOM1400D) was used to measure the roughness for 10 or more times by changing sites to be measured and movements of the stylus, which were averaged. The measurement conditions were based on JIS B0633:2001.

5. Evaluation of Abrasion Resistance

As shown in FIG. 7, a reciprocation sliding test was performed to evaluate the abrasion resistance. Firstly, in order to simulate the inner periphery of the cylinder, a plate 84 made of the aluminum alloy having the ten point height of roughness profile $R_{ZJIS}$ of 0.9 to 1.3 μm by a honing process or equivalents was prepared. A composition of each plate 84 was shown in Table 1. Then, an image of each plate 84 before test was measured by a scanning electron microscope (SEM). A surface of a two-dimensional distribution of the elements configuring the area having the composition (the particles) different from the Al matrix (base) was measured using an energy dispersive X-ray analysis (EDX) apparatus attached to the SEM. The measurement by the EDX was as described above. From the resultant two-dimensional distribution, each diameter of a circle (an equivalent circle diameter) corresponding to each area (particle) corresponding to Si, $Al_2O_3$ or $SiO_2$ is determined as the particle diameter. The diameters of all particles thus calculated were averaged.

Next, each piston ring in Examples and Comparative Examples was cut to a length of 30 mm to produce a piston ring piece 80, which was attached to a fixing jig (not shown) of an abrasion tester. A hard carbon coating at an outer periphery of the piece was forced into a surface of the plate 84 at a perpendicular load fp=100 N. Under the state, the piston ring piece 80 was reciprocated and slid at a reciprocating width of 50 mm in a thickness direction and a reciprocating frequency of 10 Hz for the test. A 1 $cm^3$ of lubricant oil (commercially available engine oil; 5W-30SM) was dropped onto the surface of the plate 84 in advance. The temperature of the plate 84 upon the test was set to 120° C. The test was performed for 20 minutes.

After the test, an oval slid scar was observed, if the hard carbon coating was abraded.

<Abrasion Amount of Hard Carbon Coating>

As shown in FIG. 8(a), an abrasion amount of the hard carbon coating was calculated. Firstly, a shape of the outer periphery including a sliding portion 80a of the piston ring piece 80 after the test was measured using the above-described stylus type surface roughness tester in a circumferential direction. Then, from the radius of curvature (known) of the outer periphery of the piston ring piece 80 before the test, an outer edge 80f of the piston ring piece 80 before the test was calculated. A maximum value of a difference in dimension between the outer edge 80f and the sliding portion 80a in the circumferential direction was determined as the abrasion amount.

As shown in FIG. 8(b), a shape measurement was performed at a position L around the center of the sliding portion 80a along an axial direction of the piston ring piece 80.

<Abrasion Amount of Plate (Simulated Cylinder)>

An abrasion amount of the plate 84 was determined by measuring roughness in a sliding direction using the stylus type surface roughness tester such that a non-sliding portion was within both ends of the length to be measured. A maximum value of a difference in dimension between a non-sliding portion and the sliding portion was determined as the abrasion amount.

The abrasion amounts of the first hard carbon coating and the plate shown in Table 1 were represented by relative values being the abrasion amount in Example 1 as 1. Similarly, the abrasion amounts of the second hard carbon coating and the plate shown in Table 2 were represented by relative values being the abrasion amount in Example 11 as 1.

<State of Sliding Face>

The sliding face (surface) of the plate 84 was observed visually and with an optical microscope to evaluate the presence of defects by the following scales: When a flaw having a length of 10 mm or more was recognized on the sliding face of the plate 84, it is denoted as "flaw". When a periodic surface wave was recognized on the sliding face of the plate 84, it is denoted as "wavy abrasion".

The results are shown in Table 1 and Table 2.

TABLE 1

| | First hard carbon coating | | | | | | |
|---|---|---|---|---|---|---|---|
| | Hydrogen content [atom %] | Carbon content [atom %] | Total of hydrogen and carbon [atom %] | Carbon excluding hydrogen [atom %] | Film thickness [μm] | Marten's hardness [GPa] | Youndg's modulus [GPa] |
| Example 1 | 25.4 | 73.1 | 98.5 | 98.0 | 5.3 | 12.1 | 169 |
| Example 2 | 21.9 | 78.0 | 99.9 | 99.9 | 2.2 | 9.7 | 152 |
| Example 3 | 33.3 | 66.6 | 99.9 | 99.9 | 7.4 | 5.2 | 71 |
| Example 4 | 30.1 | 68.3 | 98.4 | 97.7 | 9.8 | 5.9 | 91 |
| Example 5 | 28.4 | 71.2 | 99.6 | 99.4 | 3.9 | 7.9 | 129 |

TABLE 1-continued

| | | | | | | | |
|---|---|---|---|---|---|---|---|
| Example 6 | 22.3 | 76.5 | 98.8 | 98.5 | 5.7 | 12.7 | 198 |
| Comp Example 1 | 37.2 | 62.6 | 99.8 | 99.7 | 4.1 | 4.3 | 65 |
| Comp Example 2 | 22.3 | 76.5 | 98.8 | 98.5 | 1.5 | 12.7 | 198 |
| Comp Example 3 | 30.1 | 68.2 | 98.3 | 97.6 | 9.8 | 5.9 | 91 |
| Comp Example 4 | 10.2 | 87.9 | 98.1 | 97.9 | 3.3 | 14.0 | 212 |

| | First hard carbon coating | | | | Evaluation of abrasion resistance | | |
|---|---|---|---|---|---|---|---|
| | | | Plate (Cylinder simulated) | | Abrasion amount of hard carbon | Abration amount of | |
| | Deformation ratio R pe | ten point height of roughness profile R zjis [μm] | Si content [mass %] | Particle diameter [μm] | coating [relative value] | plate [relative value] | State of sliding face |
| Example 1 | 0.27 | 0.12 | 20 | 19.7 | 1.00 | 1.00 | ○ |
| Example 2 | 0.32 | 0.11 | 15 | 8.3 | 0.98 | 1.07 | ○ |
| Example 3 | 0.43 | 0.14 | 11 | 21.4 | 1.13 | 0.83 | ○ |
| Example 4 | 0.38 | 0.08 | 22 | 13.1 | 1.14 | 0.88 | ○ |
| Example 5 | 0.34 | 0.09 | 17 | 3.7 | 1.06 | 0.97 | ○ |
| Example 6 | 0.25 | 0.09 | 9 | 10.9 | 0.73 | 1.09 | ○ |
| Comp Example 1 | 0.52 | 0.12 | 15 | 8.3 | 3.24 | 0.65 | ○ |
| Comp Example 2 | 0.25 | 0.08 | 9 | 10.9 | 0.97 | 1.45 | Flaw |
| Comp Example 3 | 0.38 | 0.20 | 22 | 13.1 | 1.09 | 2.30 | Flaw |
| Comp Example 4 | 0.24 | 0.11 | 20 | 19.7 | 0.38 | 6.77 | Wavy abration |

TABLE 2

| | Second hard cabon coating | | | | | | | |
|---|---|---|---|---|---|---|---|---|
| | Hydrogen content [atom %] | Nitrogen content [atom %] | Carbon content [atom %] | Total of hydrogen, carbon and nitrogen [atom %] | Carbon and nitrogen excluding hydrogen [atom %] | Film thickness [μm] | Marten's hardness [GPa] | Youndg's modulus [GPa] |
| Example 11 | 22.6 | 8.5 | 68.0 | 99.1 | 98.8 | 3.8 | 8.1 | 135 |
| Example 12 | 28.2 | 11.3 | 58.7 | 98.2 | 97.5 | 3.1 | 5.3 | 72 |
| Example 13 | 29.6 | 3.6 | 65.8 | 99.0 | 98.6 | 5.7 | 6.1 | 76 |
| Example 14 | 18 | 11.7 | 68.6 | 98.3 | 97.9 | 9.9 | 10.7 | 134 |
| Example 15 | 16 | 5.7 | 77.8 | 99.5 | 99.4 | 4.5 | 12.6 | 189 |
| Example 16 | 20.4 | 3.4 | 75.4 | 99.2 | 99.0 | 7.8 | 8.6 | 123 |
| Comp Example 11 | 31.2 | 4.6 | 62.6 | 98.4 | 97.7 | 3.7 | 3.9 | 68 |
| Comp Example 12 | 20.4 | 3.4 | 75.8 | 99.6 | 99.5 | 1.4 | 8.6 | 123 |
| Comp Example 13 | 18 | 11.7 | 69.7 | 99.4 | 99.3 | 5.9 | 10.7 | 134 |
| Comp Example 14 | 12.1 | 2.4 | 83.4 | 98.0 | 97.6 | 3.7 | 13.8 | 207 |
| Comp Example 15 | 15.1 | 14.3 | 69.7 | 99.1 | 98.9 | 3.5 | 7.9 | 111 |

| | Second hard cabon coating | | | | Evaluation of abrasion resistance | | |
|---|---|---|---|---|---|---|---|
| | | | Plate (Cylinder simulated) | | Abrasion amount of hard carbon | Abration amount of | |
| | Deformation ratio R pe | ten point height of roughness profile R zjis [μm] | Si content [mass %] | Particle diameter [μm] | coating [relative value] | plate [relative value] | State of sliding face |
| Example 11 | 0.32 | 0.09 | 20 | 13.2 | 1.00 | 1.00 | ○ |
| Example 12 | 0.42 | 0.08 | 9 | 19.5 | 1.07 | 1.05 | ○ |
| Example 13 | 0.37 | 0.10 | 17 | 13.2 | 1.02 | 1.03 | ○ |
| Example 14 | 0.45 | 0.14 | 11 | 4.1 | 0.89 | 1.00 | ○ |
| Example 15 | 0.39 | 0.07 | 22 | 10.7 | 0.93 | 0.99 | ○ |
| Example 16 | 0.45 | 0.12 | 17 | 10.7 | 0.93 | 0.95 | ○ |
| Comp Example 11 | 0.52 | 0.11 | 15 | 8.5 | 6.20 | 0.99 | ○ |
| Comp Example 12 | 0.45 | 0.07 | 20 | 10.7 | 1.22 | 1.82 | Flaw |
| Comp Example 13 | 0.45 | 0.22 | 9 | 4.1 | 1.12 | 1.64 | Flaw |
| Comp Example 14 | 0.22 | 0.13 | 15 | 8.5 | 0.96 | 5.46 | Wavy abration |
| Comp Example 15 | 0.37 | 0.14 | 22 | 22 | 3.75 | 1.09 | ○ |

As apparent from Table 1, in Examples 1 to 6 where the piston ring including the first hard carbon coating was composed only of hydrogen and carbon coated on the outer periphery slid along the plate (simulated cylinder) made of the aluminum alloy including particles each having a diameter of 3 μm or more, and in Examples 11 to 16 where the piston ring including the second hard carbon coating was composed of hydrogen, carbon and nitrogen coated on the outer periphery slid along the plate (simulated cylinder) made of the aluminum alloy including particles each having a diameter of 3 μm or more, both of the abrasion amounts of the hard carbon coating and the plate were small and the abrasion resistance was excellent. In addition, in these Examples, no flaw was recognized on the sliding face of the plate, no trace of particles dropped was recognized, and the smooth shape could be maintained on the sliding face of the plate.

On the other hand, in Comparative Example 1 where the first hard carbon coating had the $R_{pe}$ of exceeding 0.45 and soft, the abrasion amount of the first hard carbon coating was significantly increased as compared to Example 1. Similarly, in Comparative Example 11 where the second hard carbon coating had the $R_{pe}$ of exceeding 0.45 and soft, the abrasion amount of the second hard carbon coating was significantly increased as compared to Example 11. In Comparative Examples 1 and 11, the Martens' hardness was less than 5 GPa, and the Young's modulus was less than 70 GPa.

In Comparative Example 2 where the first hard carbon coating had a film thickness of less than 2 μm, the abrasion amount of the plate was significantly increased as compared to that in Example 1. Similarly, In Comparative Example 12 where the second hard carbon coating had a film thickness of less than 2 μm, the abrasion amount of the plate was significantly increased as compared to that in Example 11. Also, in Comparative Examples 2 and 12, the flaw was produced on the sliding face of the plate, some dents probably by the particles dropped, and the smooth shape could not be maintained on the sliding face of the plate. It may appear that the hard carbon coating cannot be sufficiently elastic deformed to the indentation by the particles at the plate side as the film thickness is thin, and the particles move and scratch the plate along with the slide of the hard carbon coating.

In addition, in Comparative Example 3 where the first hard carbon coating had the ten point height of roughness profile Rzjis exceeding 0.15 μm, the abrasion amount of the plate was significantly increased as compared to Example 1. Similarly, in Comparative Example 13 where the second hard carbon coating had the ten point height of roughness profile Rzjis exceeding 0.15 μm, the abrasion amount of the plate was significantly increased as compared to Example 11. Also, in Comparative Examples 3 and 13, the flaw was produced on the sliding face of the plate, and the smooth shape could not be maintained on the sliding face of the plate. However, no dent was observed on the sliding face of the plate.

In Comparative Example 4 that was a hard coating where the first hard carbon coating had the Martens' hardness of exceeding 13 Gpa and the Young's modulus exceeding 200 GPa, the abrasion amount of the plate was significantly increased as compared to Example 1, periodic irregularities were formed on the plate, and the smooth shape could not be maintained on the sliding face of the plate. Similarly, in Comparative Example 14 that was a hard coating where the second hard carbon coating had the Martens' hardness of exceeding 13 Gpa and the Young's modulus exceeding 200 GPa, the abrasion amount of the plate was significantly increased as compared to Example 11, periodic irregularities were formed on the plate, and the smooth shape could not be maintained on the sliding face of the plate.

In Comparative Example 15 where the second hard carbon coating had the nitrogen content of more than 12 atom %, the abrasion amount of the second carbon coating was significantly increased as compared to Example 11.

DESCRIPTION OF SYMBOLS

14 hard carbon coating (first hard carbon coating, second hard carbon coating)
18 base of piston ring
18a outer periphery of piston ring
40, 41 piston ring
62 cylinder
68 particles

What is claimed is:

1. A combination of a cylinder of an internal combustion engine and a piston ring for sliding an inner periphery of the cylinder, wherein at least a sliding face of the cylinder is composed of an aluminum alloy including 8 mass % to 22 mass % of Si and at least one or more particles selected from the group consisting of Si, $Al_2O_3$ and $SiO_2$ particles each having a diameter of 3 μm or more, and
    at least an outer periphery of the piston ring is coated with a hard carbon coating wherein a total of hydrogen and carbon is 98 atom % or more of total components of the hard carbon coating, and carbon is 97 atom % or more of the total components of the hard carbon coating excluding hydrogen, wherein the hard carbon coating has a Martens' hardness (an indentation hardness) of 5 GPa to 13 GPa, wherein the hard carbon coating has a Young's modulus of 70 GPa to 200 GPa, and wherein a hydrogen content of the hard carbon coating is 20 atom % to 35 atom %.

2. A combination of a cylinder of an internal combustion engine and a piston ring for sliding an inner periphery of the cylinder, wherein
    at least a sliding face of the cylinder is composed of an aluminum alloy including 8 mass % to 22 mass % of Si and at least one or more particles selected from the group consisting of Si, $Al_2O_3$ and $SiO_2$ particles each having a diameter of 3 μm or more, and
    at least an outer periphery of the piston ring is coated with a hard carbon coating wherein a total of hydrogen, carbon, and nitrogen is 98 atom % or more of total components of the hard carbon coating, and a total of carbon and nitrogen is 97 atom % or more of the total components excluding hydrogen, wherein the hard carbon coating has a Martens' hardness (an indentation hardness) of 5 GPa to 13 GPa, wherein the hard carbon coating has a Young's modulus of 70 GPa to 200 GPa, and wherein a hydrogen content of the hard carbon coating is 15 atom % to 30 atom %.

3. The combination of the cylinder and the piston ring according to claim 1, wherein the hard carbon coating has a deformation ratio Rpe (Wp/We) represented by a ratio of plastic deformation energy Wp to elastic deformation energy We of 0.45 or less.

4. The combination of the cylinder and the piston ring according to claim 2, wherein a nitrogen content of the hard carbon coating is 3 atom % to 12 atom %.

5. The combination of the cylinder and the piston ring according to claim 1, wherein the hard carbon coating has a thickness of 2 μm or more to 10 μm or less.

6. The combination of the cylinder and the piston ring according to claim 1, wherein the hard carbon coating has a ten point height of roughness profile Rzjis of 0.15 μm or less.

7. The combination of the cylinder and the piston ring according to claim 2, wherein the hard carbon coating has a deformation ratio Rpe (Wp/We) represented by a ratio of plastic deformation energy Wp to elastic deformation energy We of 0.45 or less.

8. The combination of the cylinder and the piston ring according to claim 2, wherein the hard carbon coating has a thickness of 2 μm or more to 10 μm or less.

9. The combination of the cylinder and the piston ring according to claim 2, wherein the hard carbon coating has a ten point height of roughness profile Rzjis of 0.15 μm or less.

* * * * *